United States Patent [19]

Bordignon

[11] Patent Number: 4,780,782
[45] Date of Patent: Oct. 25, 1988

[54] MAGNETIC TAPE BACKING LEAF SPRING PARTICULARLY FOR MAGNETIC TAPE CASSETTES

[75] Inventor: Abramo Bordignon, Senago, Italy

[73] Assignee: A.T.B. S.p.A., Milano, Italy

[21] Appl. No.: 857,408

[22] Filed: Apr. 25, 1986

[30] Foreign Application Priority Data

May 28, 1985 [IT] Italy ............................... 20922 A/85

[51] Int. Cl.[4] ...................... G11B 5/74; G11B 15/60; G11B 23/00
[52] U.S. Cl. ............................ 360/130.31; 360/132; 360/130.3; 242/199
[58] Field of Search .................... 360/130.1–130.34, 360/132; 242/198, 199

[56] References Cited

U.S. PATENT DOCUMENTS

| | | | |
|---|---|---|---|
| 3,495,787 | 2/1970 | Wallace | 360/132 X |
| 3,838,463 | 9/1974 | Ysbrand | 360/130.32 |
| 3,984,049 | 10/1976 | Shawen | 360/130.31 |
| 4,087,845 | 5/1978 | Saito | 360/132 |
| 4,271,441 | 6/1981 | Greiner et al. | 360/132 |
| 4,293,885 | 10/1981 | Shirako et al. | 360/130.33 X |
| 4,314,299 | 2/1982 | Ishida et al. | 360/130.33 X |
| 4,573,095 | 2/1983 | Bordignon | 360/130.31 |

FOREIGN PATENT DOCUMENTS

| | | | |
|---|---|---|---|
| 57-205872 | 12/1982 | Japan | 360/130.3 |
| 0980154 | 12/1982 | U.S.S.R. | 360/132 |
| 1152031 | 4/1985 | U.S.S.R. | 242/199 |
| 1390794 | 4/1975 | United Kingdom | 360/130.3 |
| 2130176 | 5/1984 | United Kingdom | 360/132 |

*Primary Examiner*—Stuart N. Hecker
*Assistant Examiner*—Alfonso Garcia
*Attorney, Agent, or Firm*—Browdy and Neimark

[57] ABSTRACT

A magnetic tape backing leaf spring which includes a reed element comprising a working portion engageable directly with a tape and two supporting portions connected to the working portions by two stepped zones, the working portion getting elastically deformed when a magnetic head is inserted into the cassette, to press the tape against the magnetic head, while the angles between the stepped zones, the supporting portions and the working portion keep constant, the reed element being provided at its ends with projections extending in the longitudinal direction of it, and defining a swinging axis for the reed element along its longitudinal development.

9 Claims, 2 Drawing Sheets

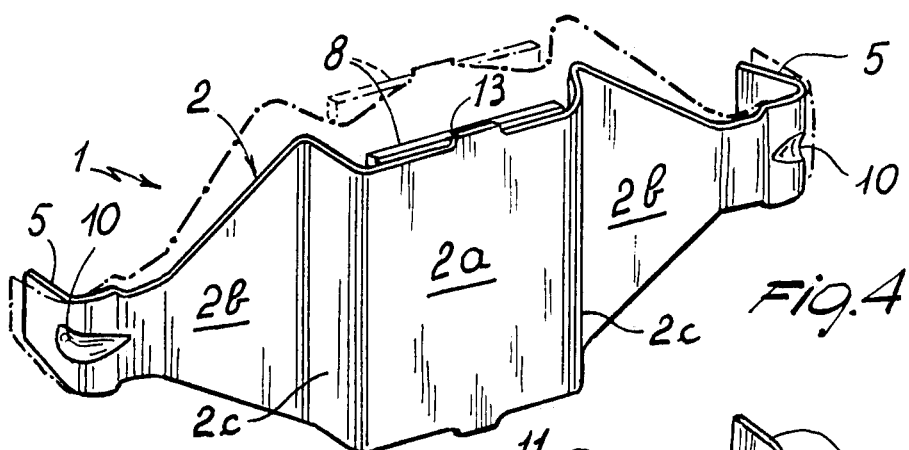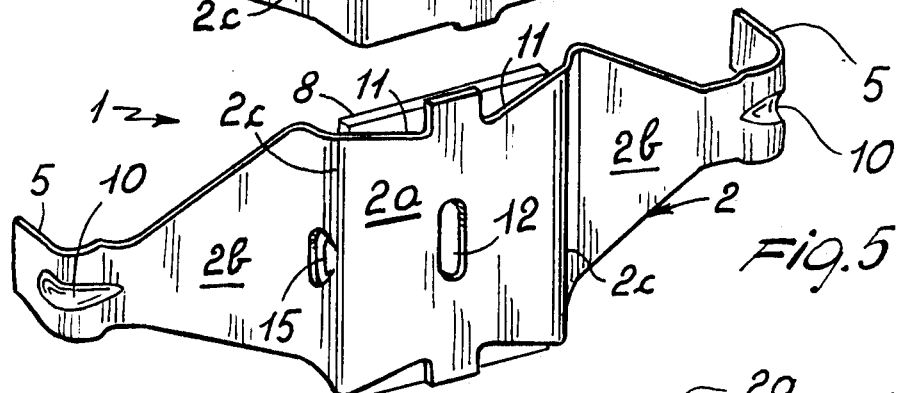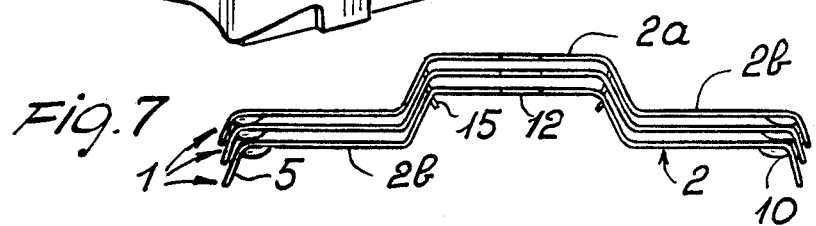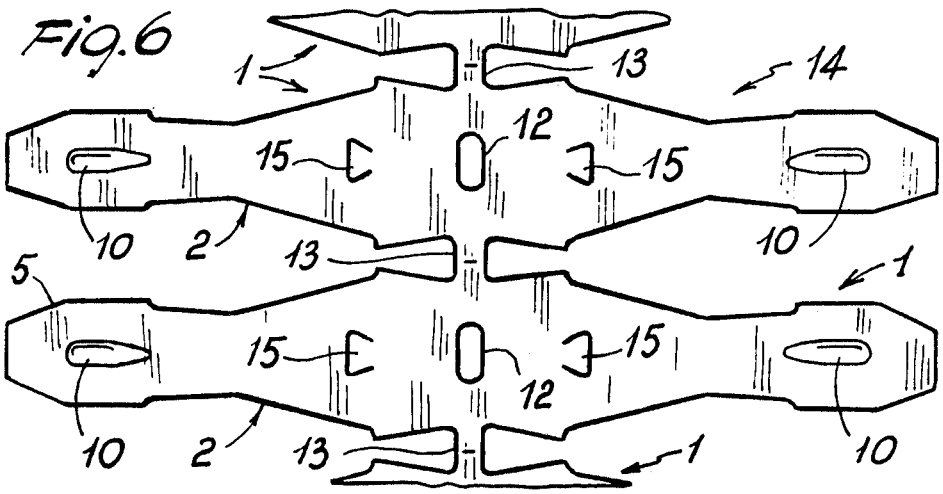

MAGNETIC TAPE BACKING LEAF SPRING PARTICULARLY FOR MAGNETIC TAPE CASSETTES

BACKGROUND OF THE INVENTION

The invention relates to a magnetic tape backing leaf spring particularly for magnetic tape cassettes.

As is known, a cassette magnetic tape is held close against the gap of a magnetic recording/playing head by a backing leaf spring arranged to engage with the tape back side.

Prior leaf springs are defined by an elastically flexible, generally metal reed which carries a contact element in direct engagement relationship with the tape. The contact element is everywhere in the form of a felt pad.

A disadvantage of prior leaf springs relates to the difficulty of securing the felt pad firmly on the elastic reed. To prevent entrainment by the running tape, some special measures are to be taken, such as disclosed in U.S. Pat. No. 4,573,095 to this same Applicant.

Also recognized is that felt pads tend to deform and stiffen after a while into a permanent shape which may not conform and accurately with a magnetic head for which they have been intended. Further, felt pads are affected by ambient conditions of humidity and temperature, and the frictional force applied to the tape will vary significantly contingent on such conditions.

Another problem, and one of growing weight with the application of magnetic tape cassettes to electronic and other delicate apparatus, is that lint or particles may detach from the felt pads and contaminate apparatus components.

In general, moreover, prior leaf spring assemblies involve significant manufacturing cost and time due to their being made from parts to be formed separately and then assembled together. Also, such leaf spring assemblies have a large volume when stored in coils of leaf spring strings or bands. In fact, the felt pads hold the overlaid leaf spring strings in such coils raised into bulky coil formations of relatively few units. Considering that such coils are to be fed into automated cassette-making equipment, it becomes necessary to arrange for coil changes at frequent intervals, which brings about reiterated shutdowns and increased manufacturing costs.

SUMMARY OF THE INVENTION

In view of the above situation, the aim underlying this invention is to provide a magnetic tape backing leaf spring which can remedy substantially the cited drawbacks, and be reliable to use even after prolonged use, in any environmental conditions, and with highly delicate equipment, while being adapted to be stored in compact coils.

Within the above aim, it is an important object of this invention to provide a magnetic tape backing leaf spring which is simple construction-wise and advantageous on account of its low frictional coefficient and ability to take an optimum attitude in guiding a tape past magnetic heads, and can provide an effective magnetic screening action.

A not least object of the invention is to provide such a leaf spring which has supports enabling it to take naturally the best position to suit the stresses applied to it.

The above aim and objects are substantially achieved by a magnetic tape backing leaf spring particularly for magnetic tape cassettes, of a type which comprises an elastically flexible reed element, and is characterized in that said reed element defines by itself both supporting portions and a working portion engageable directly with a magnetic tape and being supported by said supporting portions in a projecting position from the positions of said supporting portions, said working portion defining stepped zones with said supporting portions and being deformable elastically into a substantially arcuate configuration in the operational position.

BRIEF DESCRIPTION OF THE DRAWINGS

Further features and advantages of the invention will be more clearly apparent from the description of preferred embodiments of a magnetic tape backing leaf spring, shown in the accompanying drawings, where:

FIG. 4 shows how the leaf spring can be provided with a rigid type magnetic screen;

FIG. 5 shows how the leaf spring can be cut out and improved at its middle portion;

FIG. 6 is a plane development of a flattened leaf spring band according to the invention; and FIG. 7 shows how the leaf springs overlap one another when completely formed but still held together in a band and coiled up.

DESCRIPTION OF THE PREFERRED EMBODIMENTS

Figure 1:
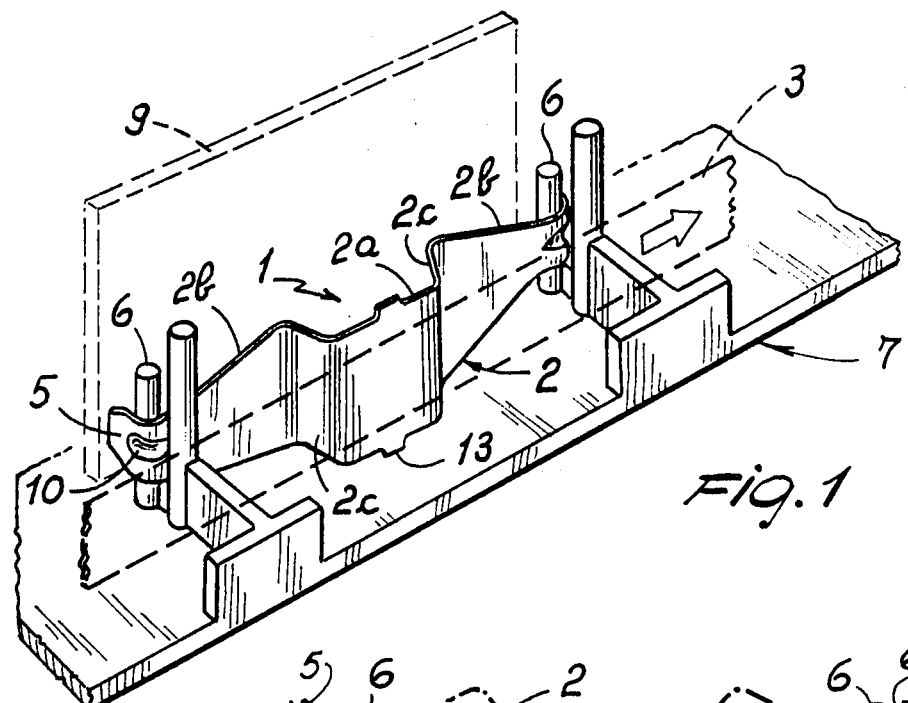
FIG. 1 shows in perspective a leaf spring according to the invention, as inserted into a conventional cassette.

With reference to the drawing figures, a magnetic tape backing leaf spring according to the invention is comprehensively designated 1. It is formed integrally by an elastically flexible reed element 2 having a prevalent longitudinal development substantially parallel to a running direction of tape 3 near to the reed element 2, and a transversal development perpendicular to said longitudinal development. The reed element 2 defines by itself both a working portion 2a having a working surface adapted to engage slidingly with a magnetic tape 3 and supporting portions 2b adapted to support the working portion 2a. Therefore the reed element 2 has a first side facing the magnetic tape 3 and a second side opposed to said first side. Between the portions 2a and 2b there extend stepped zones 2c. In the drawings, a working portion 2a is shown inserted centrally in between two supporting portions 2b; this is a typical configuration of cassettes 7 to be used with a single magnetic head 4 for both playing and recording the tape 3. The working portion 2a of contact with the tape 3 is made illustrated in FIG. 1, to span the full transverse width of the tape 3 even as the leaf spring 1 oscillates. Furthermore, it may be variously shaped; for example, it may be made straight, in the rest position, or concave on the side next to the tape 3, to provide an already part-arcuate configuration in the rest position.

In order for the working portion 2a to deflect arcuately without strain on the head 4 concentrated at the center thereof, where a gap 4a is located, it is envisaged that the middle zone of the working portion 2a be weakened by cutouts to reduce flexural strength locally. In particular, edge cutouts 11 are provided which are made deeper toward the center of said portion and inside cutouts 12 (FIG. 5).

As brought out in the figures, the stepped zones 2c, located on opposed edges of the working portion 2a, are preferably convergent to each other, toward the tape 3, so as to bring out the working portion 2a into a projection. The stepped zones 2c enhance their convergence in the operating position, affording an accurate arcuate arrangement of the working portion 2a, with no forcing on the head 4 center. As it is evident from the FIGS. 2 and 3 the stepped zones 2c, together with the edges of the working portion 2a and of the supporting portions 2b, form two symmetrically opposed Z-shaped zones. When the magnetic head 4 is inserted into the cassette 7 to contact the magnetic tape 3 the Z-shaped zones are moved in a manner to rotate them about the fixed elements 6, but they remain in their original configuration and do not appear to be deformed. Really, as shown by the FIGS. 2 and 3 and as specified in describing the operating of leaf spring 2, the stepped zones 2c retain their angles which are very little modified during the convergence of the stepped zones 2c, from solid to dot-dashed showing in FIG. 2 and enlarged as shown from dot-dashed showing to solid line showing in FIG. 3, and this convergence of stepped zones 2c toward each other tends to raise arcuately the center of the working portion 2a.

The stepped zones 2c may be variously laid out in varying dimensions and more or less rounded radiusing to the portions 2a, 2b. They are preferably sized to cause the working portion 2a to project by a smaller distance than the width of the portion in the direction of lay of the tape 3. Furthermore, those same stepped zones 2c have a comparable transverse width to the maximum transverse width of the leaf spring 1 in a parallel direction to the tape 3 and across the tape running direction.

The supporting portions 2b comprise, in the embodiments shown, two arms 2b spreading from the working portion 2a and having a smaller average transverse width than the working portion 2a which grows gradually toward same, as brought out in the drawings so that the supporting portions 2b have a flexibility growing from the working portion 2a.

The ends of the supporting portions or arms 2b of the reed element 2 are formed by folded over wings or ends 5 partly surrounding fixed elements or pegs 6 usually provided in the cassette 7.

For engaging the reed element 2 with the fixed elements 6, there are provided originally particular and simple support securements having reduced contact zones. These securements are brought out in the various figures and comprise projections such as jutting formations 10 which are rounded and formed by deep drawing. Also possible are, for example, projections in the form of lugs formed from cutout and folded over portions of the reed element 2. Said projections are in any case arranged on the remote side of the reed element 2 from the magnetic tape 3 and are so shaped as to allow the leaf spring to swing unrestrictedly about the curved surface of formation 10 allowing some swinging of reed element 2 about a longitudinal axis of the reed element 2, and allowing the reed element, and to set itself naturally at the position of best balance of the stresses to which it is subjected. To make possible said swinging of the leaf spring, a little clearance 6a, shown in the FIG. 2, is provided between at least one fixed element 6 and one wing 5 so that the reed element 2 has a longitudinal displacement parallel to its prevalent longitudinal development. As shown in the FIGS. 1, 2, 4, 5, 6, and 7, the projections 10 have a shape allowing reduced contact zones with the fixed elements 6, in spite of the displacement and even if only one projection 10 is provided close to each wing 5. Really in the preferred embodiment shown in the figures the projections 10 have a prevalent longitudinal dimension, parallel to the prevalent longitudinal development of the reed element 2 and a reduced transversal dimension, transversal to the longitudinal dimension.

The projections formed by the jutting formations 10 are advantageous on account of their simple construction and operability, since they have a substantially point zone of contact with the pegs 6.

The reed element 2 may be formed from any suitable flexible, metal or plastics, material having a low frictional coefficient.

Experiments have shown that with reed elements 2 of bronze, nickel silver, nickel, non-magnetic stainless steel, berillium copper, leaf springs 1 are obtained which have adequate springiness and a frictional coefficient on magnetic tapes which is equal to or lower than the frictional coefficient between a felt pad and the tape. For example, a frictional coefficient of about 0.12–0.15 has been measured.

Much reduced frictional coefficients, e.g. of 0.07–0.08 may be attained by using such valuable materials as oxidized aluminum.

Advantageously, the leaf spring of this invention may have at least the working zone 2a treated or lagged with a thin layer of a material having a lower frictional coefficient on magnetic tape 3 than the reed 2 material. In fact, by either galvanic or coating processes, or plastic films, or else, one can treat the leaf spring 1 surface to achieve much reduced frictional coefficients irrespective of the value of the material used to fabricate the reed element 2.

Advantageous on the leaf spring 1 is the application of a magnetic shield 8 at the remote face of the working portion 2a from the tape 3; the shield is close to the tape 3 and the head 4. The magnetic shield 8 may be made very thin and flexible with the working portion 2a, or rigid and attached centrally to that portion, as shown in FIG. 4. In the latter case, attachment may be accomplished by either acrylic resins, electric spot welding, or hot melts.

Owing to its proximity to the tape 3 and the head 4, a shield applied to the working portion 2a is exceptionally effective even if quite thin. This enables the magnetic shield 8 to be formed from highly expensive materials, such as a particular high-permeability magnetic alloy known as "mumetal" or having an amorphous structure.

Figure 2:
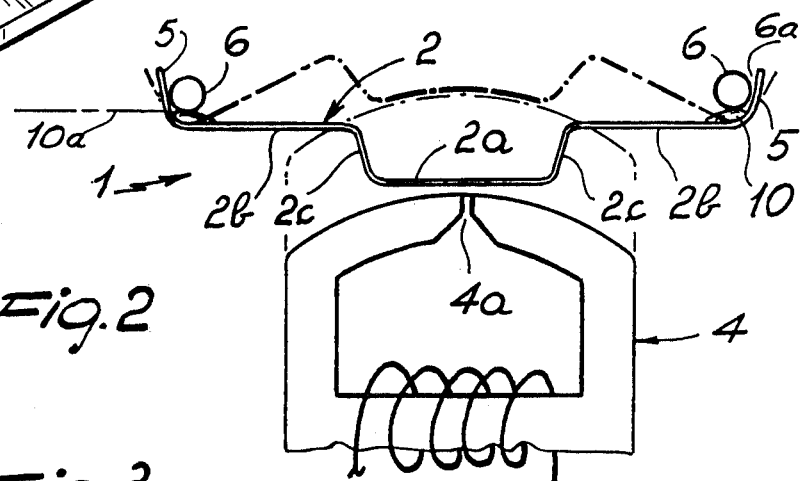
FIG. 2 shows in plan view the leaf spring of FIG. 1 in its rest position, and in dash lines, in its operating position in biased relationship with a recording/playing magnetic head.

The magnetic shield 8 may be utilized in combination with a conventional magnetic shield 9, away from the tape 3 (FIG. 1). The reed element 2 itself might form a magnetic shield if made of a high-permeability magnetic material and provided with a surface layer of a nonmagnetic material at the face of the working portion 2a next to the magnetic tape. In fact, the magnetic noise fields would close in that case on the reed element 2 itself.

In the drawings, each leaf spring 1 has peduncles 13 for connection to leaf springs 1 in one band 14, still shown in FIG. 6 in its flattened condition. Once the leaf springs have set in their final shape they may be supplied in bands which are adapted to be wound into tight coils as shown FIG. 7. The formed coils may have a density which is about four times as high as that of conventional leaf spring coils.

It is also envisaged that suitable spacers may be used to avoid interlocking the leaf springs together. FIGS. 5,6,7 show protuberances 15 formed from cut out and folded portions of the reed element 2.

The inventive magnetic tape backing leaf spring is used as follows.

The leaf spring 1 is insertable into a conventional cassette 7 like known leaf springs. However, it would fit true on the magnetic tape 3 and the contours of the heads 4 without requiring felt pads or the like elements, and this while overcoming all the problems connected with the use of felt pads.

Figure 3:
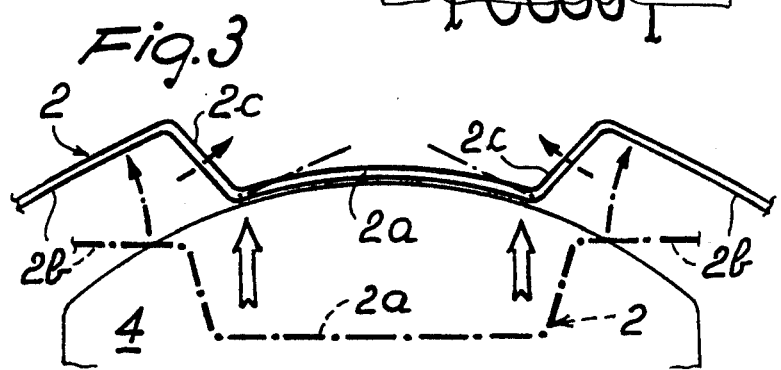
FIG. 3 shows a portion of FIG. 2 to an enlarged scale and how the leaf spring is deflected into its operating position.

In fact, when a magnetic head 4 exerts a bias action on a leaf spring 1, the center zone of the working portion 2a is first deflected where edge cutouts 11 and inside cutouts 12 may be advantageously provided to favor deflection. Then also the edges of the working portion 2a are immediately engaged at the stepped zones 2c. It is the latter that will transfer directly the elastic stresses of the arms 2b to a large extent, preventing enhanced pressures on the gap 4a located centrally to the head 4 and holding the tape 3 close against the working portion 2a over the entire length thereof. The stepped zones 2c tend to retain the initial angles to the working portion 2a and accordingly, on increasing their mutual convergence, they tend to raise arcuately the center of the working portion 2a, as shown in FIG. 3, avoiding high pressures on the gap 4a.

Precise positioning of the working portion 2a is also determined by the projections 10 enabling the reed element 2 to swing freely about an axis close to the line of lay of the leaf spring and to arrange itself naturally in the position of least forcing. Said projections are particularly important to the operability of the leaf spring and may be advantageously implemented with various leaf spring designs. If fact, the projections serve the purpose of accommodating any imperfections in the positions and shapes of the pegs 6, which engage with the leaf springs, and of also accommodating small errors in the positioning of the head 4 relatively to the cassette 7.

Precise positioning of the leaf spring 1 and the absence of overpressures on the gap 4a acquire basic importance when it is considered that many of the currently available magnetic tapes contain such particular materials as chromium oxide, chromium-iron, and "metal", which are apt to increase wear of the magnetic heads;

Also revealed is a reduced frictional coefficient, which can be brought down to very low values by said surfaces treatments, and optimum magnetic shielding is provided by the magnetic shield 8 being adjacent the magnetic tape and the magnetic head.

Actual tests have also brought out minimization of electrostatic discharges because of the low average resistivity of the system.

The leaf spring 1 further enables compact high-density rolls to be formed, and is simple construction-wise and easily implemented.

I claim:

1. A magnetic tape backing leaf spring, particularly for a magnetic tape cassette with a magnetic head acting on a magnetic tape and fixed elements of the casette positioned to support the leaf spring in the cassette, the leaf spring comprising:

a reed element presenting a prevalent longitudinal dimension and a first side facing the magnetic tape and a second side parallel to said first side, with said reed element deformed when in operational position by pressure of the magnetic head pressing the magnetic tape against said reed element;

said reed element formed of an elastically flexible material, the elasticity of said flexible material varying with the difference in transverse width and weakened structure of said reed element, the greater the transverse width, the less the elasticity and greater the rigidity;

said reed element including:

an elastically deformable working portion having a working surface directly engageable with the magnetic tape, said working surface having a low frictional coefficient thereby presenting a low frictional coefficient surface to the magnetic tape pressed to said working surface;

two supporting portions extending with decreasing transverse width in a longitudinal direction from said working portion and having end portions, each extending around one of the fixed elements of the cassette;

two symmetrically opposed stepped zones on opposite sides of said working surface, connecting said working surface to said supporting portions and having a transverse width comparable to the maximum transverse width of said reed element with said stepped zones thus forming areas of maximum rigidity on said reed element;

said reed element separated from the magnetic head in non-working position unitarily formed with said working portion in substantially a first longitudinal plane, said supporting portions in substantially a second longitudinal plane, said stepped zones extending in planes at an angle to said first and second longitudinal planes, and said supporting portions being substantially parallel to said working portion;

said reed element in operational position engageable with the magnetic tape, deforming said reed element with the magnetic head, said stepped zones retaining their initial angles relative to said working portion while deforming said working portion into a substantially arcuate configuration with said working portion between the magnetic tape and said supporting portions.

2. The magnetic tape backing leaf spring of claim 1 wherein said supporting portions which are extending with decreasing transverse width in a longitudinal direction from said working portion are elastically deformable elements expanding from said working portion having a flexibility increasing with their distance from said working portion.

3. The magnetic tape backing leaf spring of claim 1 wherein:

said supporting portions include:

projections jutting out of said second side of said reed element and close to said end portions;

said projections having a reduced contact zone with at least one of the fixed elements of the cassette, said contact zone defining a curve of movement against the fixed element for movement of said reed element about a longitudinal axis extending along the prevalent longitudinal dimension of said reed element.

4. The magnetic tape backing leaf spring of claim 3 wherein:
said projections jutting out of said second side of said reed element each have a prevalent longitudinal dimension parallel to said prevalent longitudinal dimension of said reed element, and a reduced transversal dimension, transversally to said longitudinal dimension of said projection.

5. The magnetic tape backing leaf spring of claim 1 wherein:
said stepped zones are Z shaped zones.

6. The magnetic tape backing leaf spring of claim 1 wherein:
said low frictional coefficient working surface is due to said reed element being of a low frictional coefficient material.

7. The magnetic tape backing leaf spring of claim 1 wherein:
said low frictional coefficient working surface is formed by facing of a layer of low frictional coefficient material on said working surface.

8. The magnetic tape backing leaf spring of claim 1 wherein:
a flexible magnetic shield movable with said working portion is mounted on the second side of said reed element on said working portion.

9. The magnetic tape backing leaf spring of claim 1 wherein:
said working portion has cutout portions to produce weakened structure and greater flexibility of said working portion

* * * * *